April 20, 1948.  G. R. GREENSLADE  2,440,044
DEVICE FOR MAKING ELECTRICAL-CONDUCTIVITY TESTS ON TUBULAR ARTICLES
Filed March 24, 1943   4 Sheets-Sheet 1

INVENTOR
Grover R. Greenslade
By Stebbins and Blenko
his Attorneys

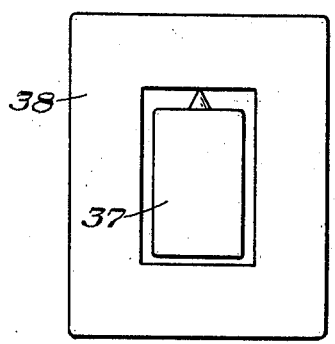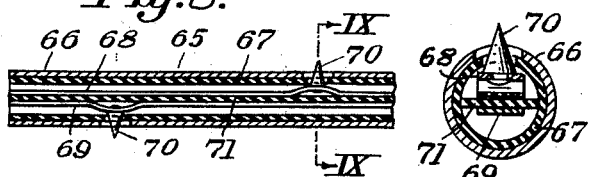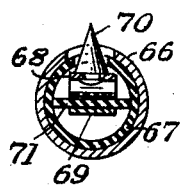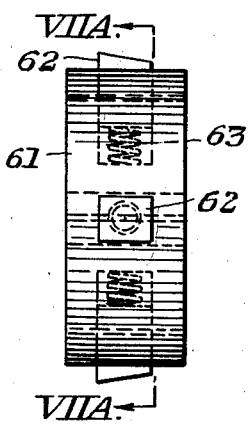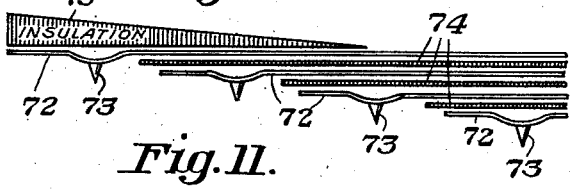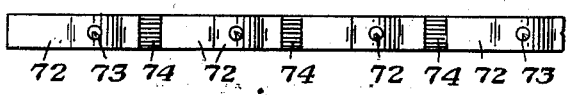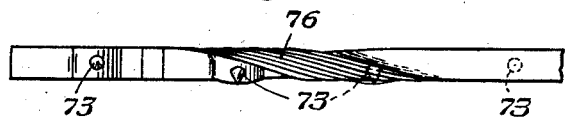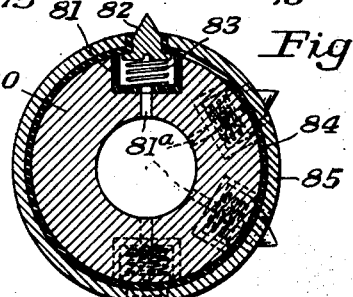

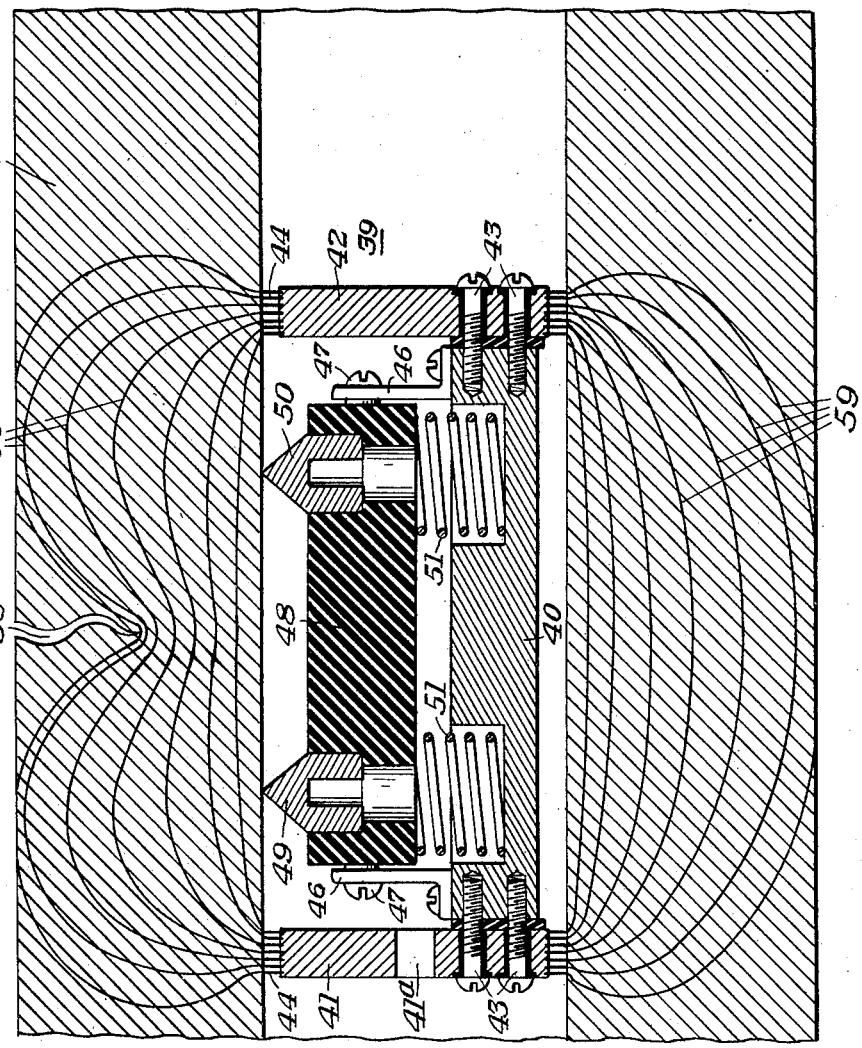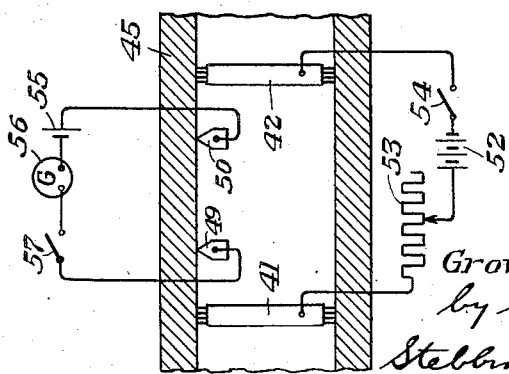

April 20, 1948.  G. R. GREENSLADE  2,440,044
DEVICE FOR MAKING ELECTRICAL-CONDUCTIVITY TESTS ON TUBULAR ARTICLES
Filed March 24, 1943  4 Sheets-Sheet 4
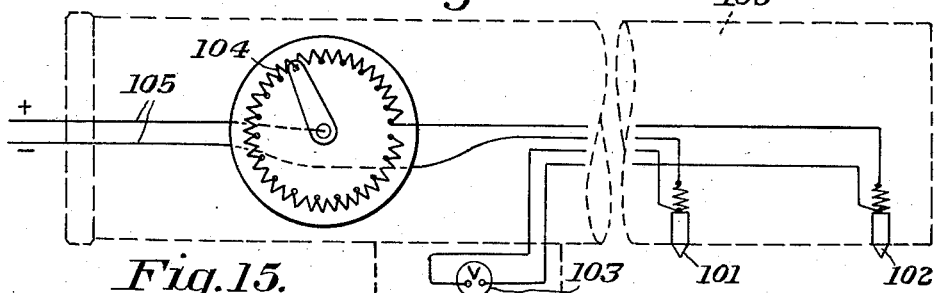
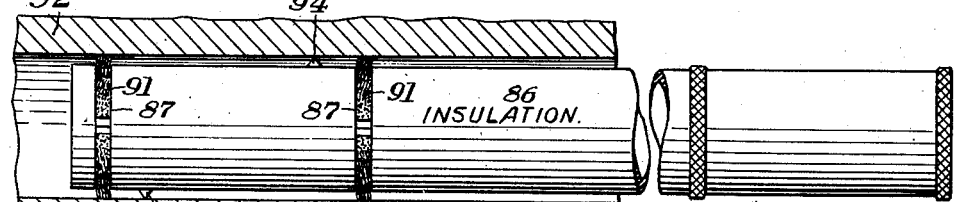
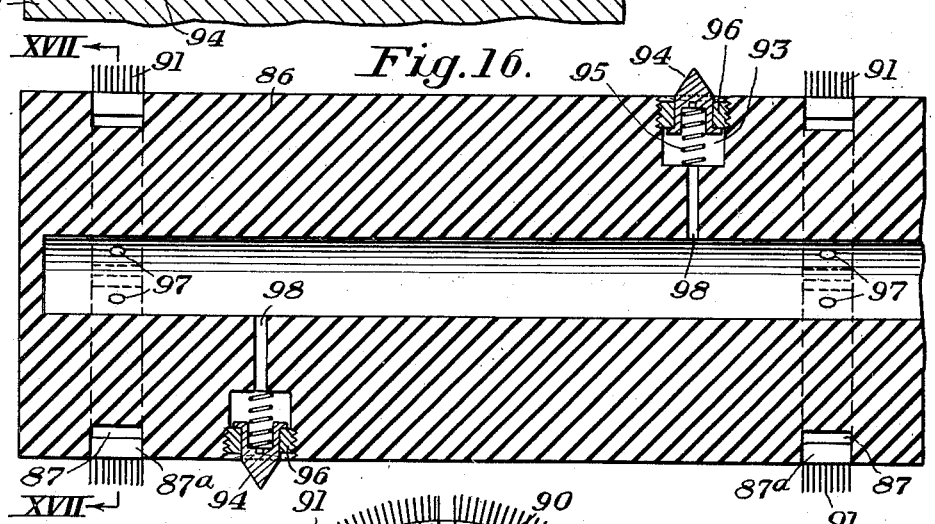
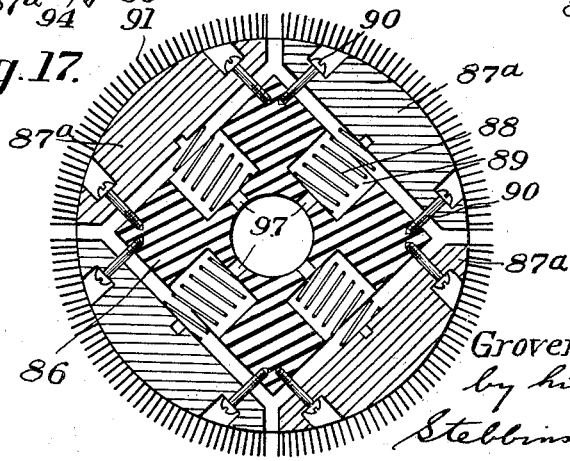
INVENTOR
Grover R. Greenslade
by his attorneys
Stebbins and Blenko Patented Apr. 20, 1948

2,440,044

UNITED STATES PATENT OFFICE 2,440,044

DEVICE FOR MAKING ELECTRICAL-CONDUCTIVITY TESTS ON TUBULAR ARTICLES

Grover R. Greenslade, Scott Township, Allegheny County, Pa., assignor to Flannery Bolt Company, Bridgeville, Pa., a corporation of Pennsylvania Application March 24, 1943, Serial No. 480,285

4 Claims. (Cl. 175—183)

This invention relates to the testing of metal articles and, in particular, to the testing of hollow or tubular articles for the presence of a defect such as a fracture resulting from stresses to which the article is subjected in service. My invention is, specifically, an improvement on the testing device disclosed in my Patent No. 2,091,634.

The present invention, like the apparatus of the patent aforementioned, utilizes the change in the resistance of the article being tested upon the occurrence of a fracture therein. This change in resistance is detected by circulating a current through the article and observing the voltage drop between a succession of pairs of equally spaced points along the length of the article. The improvement with which the present invention is concerned is in the manner of and means for circulating current through the article under test.

In a preferred embodiment and practice of the invention, I provide a testing device adapted to be inserted within a hollow or tubular article to be tested, said device having current contacts adapted to engage the interior surface of the article, said contacts being connected to a suitable source of current which may either be external to the device or mounted therein. In addition, the device is provided with a pair of voltage contacts also adapted to engage the interior of the article being tested, said contacts being connected to an indicator such as a voltmeter or galvanometer. The invention may take any one of numerous different forms some of which are illustrated in the accompanying drawings. Further novel features and advantages of the invention will become apparent during the following detailed description and explanation referring to said drawings. In the drawings, Fig. 1 is a longitudinal section through one form of testing device embodying the invention and including a self-contained current source;

Figure 5 is a view similar to Figure 4 showing a modified form of testing device for use in articles having rectangular openings therein instead of round holes.

Figure 6 is a longitudinal sectional view through a tubular article to be tested with a modified form of testing device inserted therein;

Figure 6a is a diagram of the circuit connections used with the testing device of Figure 6;

Figure 7 is a side elevation of a modified form of current contact adapted to be used with the testing device of Figure 6;

Figure 7a is a sectional view taken along the plane of line VIIa—VIIa of Figure 7;

Figure 8 is a partial longitudinal section through a further modified form of testing device, specifically a device intended for articles having relatively small bores such as staybolts for locomotive boilers;

Figure 9 is a transverse section through the device of Figure 8 taken on line IX—IX thereof;

Figure 10 is an exploded view illustrating the assembly of a further form of testing device;

Figure 11 is a side elevation thereof after the initial stage of assembly;

Figure 12 illustrates a further step in the formation of the complete device;

Figure 13 illustrates a still further step which may if desired be the final step of enclosing the device in a sheath of insulation;

Figure 14 is a side elevation showing the device enclosed in a protective metal tube;

Figure 14a is a transverse section through a further modification of testing device;

Figure 15 is a partial longitudinal section through a device to be tested showing another form of device inserted therein;

Figure 16 is a central longitudinal section through the forward end of the device of Figure 15;

Figure 17 is a transverse sectional view on the plane of line XVII—XVII of Figure 16; and Figure 18 is a diagrammatic view illustrating a further modification of testing device.

Figure 1:
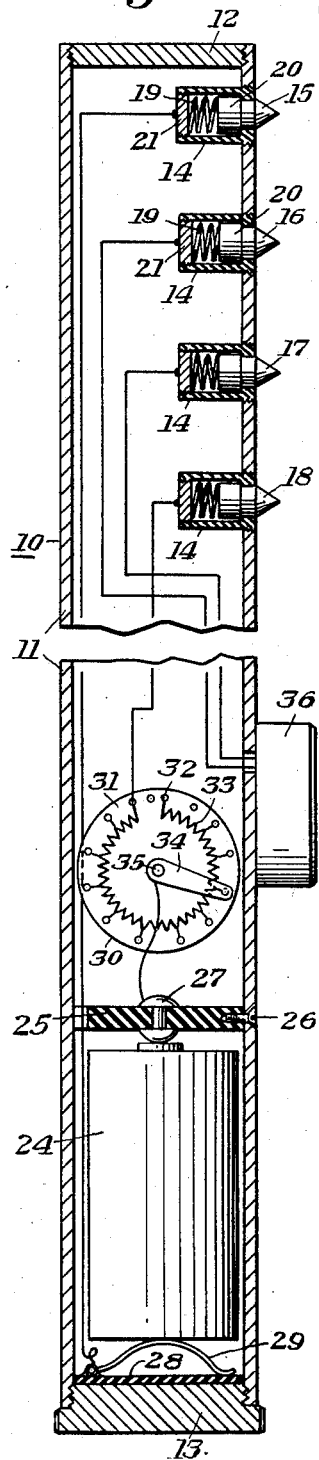
Figure 2:
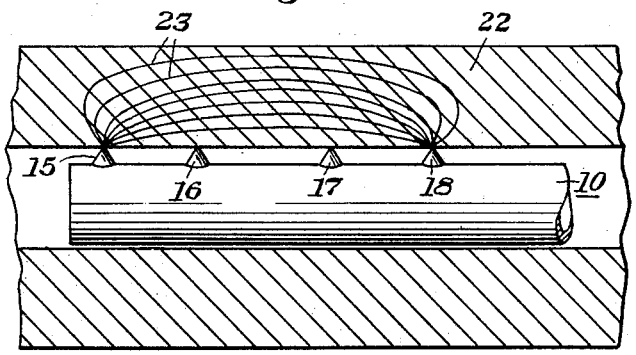
Figure 2 is a diagrammatic view showing in longitudinal section a tubular or hollow body having the testing device inserted therein.

Referring now in detail to the drawings and, for the present, to Figures 1 and 2, one form of testing device embodying my invention is indicated generally at 10 and includes a tubular casing or shell 11 of such size as to be capable of insertion into the articles to be tested, having a closure disc 12 screwed into the forward end and a removable cover 13 similarly secured to the rear end. Bushings 14 of insulaitng material have their outer ends threaded into tapped holes through the walls of the casing 11 and projecting inwardly thereof. The bushings may be spaced along the length of the casing at a convenient distance apart and are adapted to receive contact points 15, 16, 17 and 18, the ends of which project outwardly of the casing 11 and are yieldingly urged to their outermost positions by springs 19. The contact points have shoulders 20 engaging contracted necks formed at the outer ends of the bushings 14 to limit their outward movement. Closure discs 21 are threaded into the inner ends of the bushings 14 to secure the springs 19 in place. The closures 21 also serve as a convenient point for the attachment of circuit conductors since they are in constant electrical contact with the points through the springs 19 which are of metal.

Points 15 and 18 serve as current contacts and the points 16 and 17 as voltage contacts. All the points engage the interior of a hollow or tubular article to be tested such as that indicated at 22 which may be a hollow axle, locomotive crank pin or the like. As indicated by the current flow lines 23 in Figure 2, an electric current flows between the points 15 and 18, through the metal or other electrically conducting material of which the article or member 22 is composed. Current may be supplied to the points 15 and 18 from any suitable source. In the device of Figure 1, I provide a current source in the form of a dry cell 24 positioned in the rear or handle end of the casing 11. An insulating disc 25 secured transversely in the casing 11 by screws 26 is provided with a central contact 27 adapted to be engaged by the center terminal of the cell 24. A disc 28 of insulating material resting on the cover 13 has a leaf spring 29 which keeps the center terminal of the cell in engagement with the contact 27 and also serves as a contact engaging the bottom of the cell.

A rheostat 30 is mounted in the casing 11 in any convenient manner and preferably comprises a disc 31 of insulating material having contact points 32 connected at intervals to a resistor 33. A rotating contact finger 34 is secured to a shaft 35 projecting radially from the casing 11 and having a suitable operating knob thereon (not shown).

As clearly shown in Figure 1, the point 15 is connected directly by a suitable conductor to the spring 29. The point 18 is similarly connected to one end of the resistor 33 while the contact finger 34 is connected to the contact 27. It will thus be apparent that when the contacts 15 and 18 are bridged by electrically conducting material, a current will flow through the latter depending on the adjustment of the finger 34 of rheostat 30. The points 16 and 17 are connected directly by suitable conductors to a voltmeter 36 mounted on the rear or handle portion of the casing 11.

To use the device 10, it is simply inserted in the interior of the hollow article to be tested, such as that shown at 22, with the contact points in engagement with the interior surface thereof. After the device has first been inserted, the rheostat 30 is adjusted to produce a suitable reading on the voltmeter 36. It will be understood that current flowing between the contacts 15 and 18, as shown in Figure 2, results in a voltage drop from point to point along the path between the contacts. The reading on the voltmeter, of course, is the voltage drop between the points on the article 22 engaged by the contact points 16 and 17. The exact value of this voltage is immaterial so long as it provides a readily readable indication on the voltmeter such that any variation may be immediately perceived.

When the rheostat has been adjusted to give such reading, the device 10 is moved longitudinally of the article 22, maintaining contact of the points with the interior of the article. So long as the material of the article 22 between the points on the interior thereof engaged by the contact points 16 and 17 is without any defect such as a crack or fracture, the voltage drop between the points 16 and 17 will remain constant since the current circulating through the article between contacts 15 and 18 is constant and the resistance of the article between the points 16 and 17 is the same regardless of the position of the device. If the movement of the device longitudinally into the article being tested results in the points 16 and 17 being located on opposite sides of a defect such as a fracture or crack, a variation in the reading of the voltmeter 36 will immediately be perceived. This is because the presence of a defect such as a fracture reduces the sectional area of the metal available for carrying current, little or no current passing from one surface of a transverse fracture to the other. The increased resistance, of course, reduces the total current flowing. The voltage drop between the contacts 15 and 18, however, remains substantially the same. There is a redistribution, however, of this total voltage drop so that a greater portion of it occurs between points 16 and 17, the drop between the points 15 and 16 and 17 and 18 being correspondingly reduced.

Figure 3:
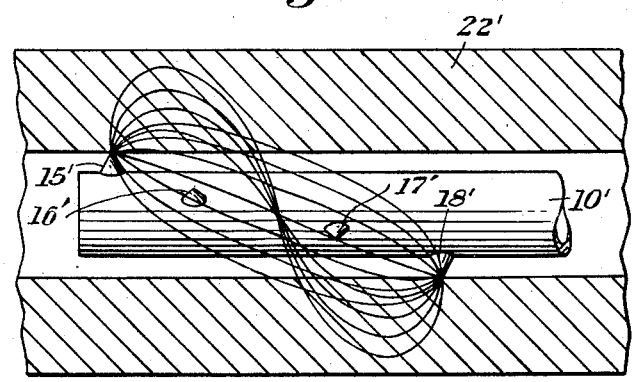
Figure 3 is a view similar to Figure 2 showing a slight modification of the construction of the testing device.
Figure 4:
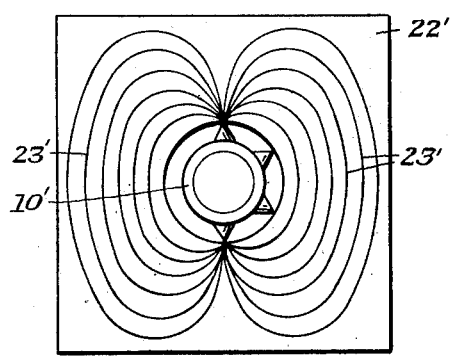
Figure 4 is a diagrammatic view showing the article under test in end elevation with the testing device of Figure 3 inserted therein.

The device 10, when used in the manner just explained, indicates the presence of a defect adjacent the plane through the contact points and the axis of the article being tested. For a complete test, therefore, it may be necessary to insert the device at various angles. By this mode of manipulation, the angular location of a defect about the axis of an article may be determined as well as the location thereof relative to the axial length. If the angular location of a defect about the axis of the article is of little or no interest, the form of device shown in Figures 3 and 4 may be preferred since it indicates a defect on one passage through the article regardless of the angular location thereof. The testing device indicated at 10' in Figures 3 and 4 is similar to the device 10 except that the contact points are disposed on a helix, i. e., are spaced angularly about the circumference of the device and along the length thereof. As a result of this construction, current flows through the article 22' along paths 23' in both directions around the hole or bore through the article. The resistance of practically any path along which current may flow between the points 15' and 18' would be increased by the presence of a defect such as a transverse fracture regardless of the location thereof about the axis of the bore through the article. This change in resistance will be immediately reflected in a change of the voltage drop between the points 16' and 17' as indicated on the voltmeter 36, as the device 10' is moved along the bore through the article 22'.

It will be seen from the foregoing that the current supplied for testing, according to the present invention, is confined to the particular article being tested and to only a relatively small portion of the length thereof. It is thus possible to use a current source of low capacity such as a dry cell, and the device may, therefore, be entirely self-contained. A separate source may be used as well, however, merely by extending to such source the leads shown connected to the terminals of the cell.

Figure 5 illustrates a modified form of testing device 37 adapted for use in testing articles such as that indicated at 38 having an opening therethrough of non-circular shape. The device 37 is similar in all respects to the device 10 except in the shape of the casing forming the body and enclosure thereof.

Figure 6 illustrates a further form of testing device 39 comprising a base 40 having discs 41 and 42 secured to each end thereof by screws 43 but insulated therefrom. The base 40 may be of any suitable material but the discs are of metal and are provided with conducting bristles 44 composed of suitable material such as wire, adapted to engage the interior of an article to be tested such as that indicated at 45. The base 40 has brackets 46 at the ends thereof, the upstanding portions of the brackets having slots adapted to receive screws 47 threaded into a block of insulation 48. The block 48 has contact points 49 and 50 embedded therein so as to engage the interior of the article 45. Springs 51 serve to hold the contact points yieldingly against the interior of the article 45. The device 39 may be provided with any convenient form of handle (not shown) to facilitate manipulation thereof.

As shown in Figure 6a, the discs 41 and 42 with their bristles 44 engaging the interior of the article 45 serve as current contacts while the points 49 and 50 serve as voltage contacts. The disc 41 has a hole 41a therethrough to admit leads (not shown in Figure 6) extending to the disc 42 and contact points 49 and 50. The discs 41 and 42 are connected in circuit with a current source 52, a control rheostat 53 and a switch 54. The points 49 and 50 are connected in series with a standard cell 55, a galvanometer 56 and a switch 57.

The device 39 operates on the same theory as the device 10 but the operating procedure is slightly different. With the device inserted in the article as shown in Figure 6, the rheostat 53 is adjusted after closing the switch 54, to give a zero reading on the galvanometer 56 when the switch 57 is closed. In other words, the voltage drop between the points 49 and 50 caused by the flow of current between the discs 41 and 42 through the article 45 is made equal to the voltage of the standard cell 55. When the adjustment has been made, the device is moved along the bore through the article 45 with the switches 54 and 57 closed. Any variation of the resistance of the article between the points 49 and 50 such as would be caused by a partial fracture 58 immediately shows up on the galvanometer 56. Such a definite reading on the galvanometer as contrasted with the normal zero indication affords a ready signal to the user of the presence of a defect. The altered distribution of the current as a result of the presence of the fracture 58 is clearly shown in Figure 6 in which flow lines 59 indicate the normal current distribution through the sound portion of the article while flow lines 60 show the distribution which results from the presence of a fracture.

Figures 7 and 7a show an alternate form of current contact adapted to be substituted for the discs 41 and 42 of Figure 6. Discs 61 of insulating material have radial recesses adapted to receive contact brushes 62 of carbon or similar conducting material. Springs 63 disposed in the recesses normally urge the brushes outwardly and removable pins 64 passing through slots in the brushes limit their outward movement. The contact faces of the brushes are beveled to facilitate the insertion into the bore of a tubular member to be tested, of a testing device having the modified type of current contacts. As shown in Figure 7a, the discs 61 have screw holes for attachment to the ends of the member 40 in the same manner as the discs 41 and 42.

Figures 8 and 9 illustrate a further type of construction particularly adapted for devices having holes of small bore such as staybolts. This type of device indicated at 65 comprises a metallic casing or tube 66, a liner 67 of insulation and conducting strips 68 and 69 having contact points 70 projecting outwardly therefrom. The casing 66 and liner 67 have holes spaced therealong to admit the contact points 70. In assembling a testing device of this type, the liner 67 is positioned with its holes in alignment with those in the casing 66. The contact strips 68 and 69 are then inserted in the liner and adjusted so that their contact points are in alignment with the holes in the liner and casing. A separator strip 71 of insulating material is then inserted between the strips 68 and 69 and forces the points 70 outwardly through the holes in the liner and casing. The strips 68 and 69 are bent outwardly where the points 70 are attached, thereby providing a resilient engagement of the points with the interior of a tubular member being tested.

This device as shown with but two contact points 70 spaced longitudinally, and oriented 180° apart, may be used for articles having holes of small diameters, in a circuit such as that shown in Figure 18. It may, however, be used in connection with the circuit as shown in Figures 1 and 6a by supplying another pair of terminals 70 with additional strip-spring members such as 68 and 69, by passing insulated lead wires from the additional pair through any of the spaces shown in Figure 9 within the insulating tube 67. In applying the device of Figures 8 and 9 in the latter cases, there is, of course, a somewhat different orientation of the contact points from that which is shown in Figures 1 and 6a.

Figures 10 through 14 illustrate several steps in the manufacture of a slightly different type of device. Contact strips 72 having points 73 secured to bowed-out portions near the ends thereof are laid one on the other with strips 74 of insulation therebetween. A tapering block of insulation 75 is applied to one side of the assembly of strips, the conducting strips 72 and insulation strips 74 being stepped back successively from the thick end of the block. When the parts have been properly assembled, they form an elongated member of approximately rectangular section at all points, having radially projecting contact points spaced therealong. If it is desired to have the contact points positioned on a helix as in Figure 3, the assembled strips are given a twist of 180° as indicated at 76. A wrapping of insulating tape 77 is then applied as shown in Figure 13 and the device may be used in that form. As a further protection, however, a metal casing 78 having holes therein for the points 73 may be applied. It will be understood that the casing 78 must be formed up from the flat around the core of the device shown in Figure 13 and the joint between the abutting edges closed in any suitable manner as by soldering or welding.

Figure 14a illustrates a further modified construction which may be used either in devices such as those shown in Figures 1 through 6 for testing large articles or in devices such as those of Figures 8 through 14 for smaller articles. According to this modification, a cylinder 80 of any suitable material has recesses 81 spaced along the length thereof and also circumferentially, adapted to receive contact points 82 urged outwardly by springs 83. The recesses are lined with insulation and a sheath 84 of insulation surrounds the cylinder 80. A protective casing of metal 85 encloses the entire device. Radial holes 81a admit leads from the points 82 to a central bore through the cylinder 80 for connection to current supply means and indicator as in Figure 1. It will be understood that the contact points 82 which are farthest apart serve as current contacts while the other contacts are voltage contacts.

Figures 15 through 17 illustrate a further modification of testing device. According to this modification, a cylinder 86 of insulating material has spaced slots 87 milled therein. The slots have flat bottoms the portions of which are at 90° to each other as shown in Figure 17 and have segmental brushes 87a disposed therein. The brushes include blocks which are normally urged outwardly by springs 88 disposed in radial recesses 89 formed in the cylinder 86. Outward movement of the brushes is limited by screws 90. The brushes 87a have bristles 91 similar to those shown at 44 for engagement with the interior of a hollow or tubular member to be tested such as indicated at 92.

The brush blocks are so disposed about the member 86 that their bristles engage the member 92 throughout substantially the entire inner circumference thereof.

The cylinder 86 also has radial recesses 93 as shown in Figure 16 spaced along the length thereof and 180° apart on the periphery thereof, adapted to receive contact points 94. The points 94 are normally urged outwardly by springs 95 and are reciprocable in bushings 96 threaded into the recesses 93.

It will be apparent that the brushes 87a may be connected to a suitable current source and control device, in the manner indicated in Figure 1, by leads extending through the recesses 89 and radial holes 97 to the central bore through the cylinder 86 and thence longitudinally thereof. Similarly, the points 94 may be connected to serve as voltage contacts by leads extending through the recesses 93 and passages 98 to the central bore. The manner of using the device of Figures 15 through 17 is the same as has already been described with reference to Figure 1.

Figure 18 illustrates a further modification in which a testing device 100 is provided with only two contact points 101 and 102. The testing device 100, otherwise generally similar to that shown in Figure 1, including a voltmeter 103 and a rheostat 104. Instead of using a self-contained current source, however, the device 100 is provided with leads 105 extending to an external current source. A testing device of the type shown in Figure 18 is useful only in cases where the contact resistance between the points 101 and 102 and the interior of the article or member being tested is of the same order of magnitude as the resistance of the portion of the length of the latter between the contact points with a defect such as a fracture therein. Under these conditions, the redistribution of the voltage applied to the contact points 101 and 102 as between the actual points of contact thereof with the member being tested and the portion of the length of the latter between the points is sufficient to give a change in the indication of the voltmeter 103. The magnitude of the change in voltage indicated by the voltmeter 103 is proportional to the current being circulated through the member being tested and it is for this reason that leads 105 to an external current source are provided so that relatively heavy currents may be employed.

It will be apparent from the foregoing description and explanation that the various forms of testing device contemplated by my invention have the common advantage that the current utilized circulates only through the particular member being tested and through only a small portion of the latter at any one time. This makes possible the use of a current source of limited capacity and insures that sufficient current to operate the detecting mechanism will always be present in the particular article being tested. It will be appreciated that this is a distinct improvement over prior testing devices contemplating the supply of current to a plurality of articles simultaneously by means of separate terminals adapted to be applied to members in electrical contact with a plurality of the articles to be tested. By my invention, I am able to test hollow articles satisfactorily with a relatively small current and I am always assured that the testing current passes through the article under test, instead of being by-passed through adjacent parallel paths.

Although I have illustrated and described several forms which my invention may take, it will be understood that changes in the construction or arrangement of parts disclosed may be made without departing from the spirit of the invention or the scope of the appended claims.

I claim:

1. Apparatus for testing hollow articles of electrically conducting material comprising an elongated member insertible into said articles, contacts projecting laterally from said member and spaced longitudinally and circumferentially thereof, a current source connected to said contacts for circulating an electric current longitudinally and circumferentially through an article when the member is inserted therein so that said contacts engage the interior of the article, and voltage contacts on said member adapted when the member is inserted in the article to engage the latter at points spaced along the path of said current.

2. Apparatus for testing hollow articles of electrically conducting material comprising an elongated member insertible into said articles, contact brushes spaced along said member and projecting laterally therefrom adapted to engage the article when the member is inserted therein, each brush including a disc normal to said member and electrically conducting bristles extending outwardly therefrom substantially throughout the periphery of the disc, a current source on said member connected to said brushes and voltage contacts spaced along said member between said brushes and adapted to engage the article when said member is inserted therein.

3. Apparatus as defined by claim 2 characterized by said discs comprising a plurality of segments mounted on said member.

4. Apparatus as defined by claim 3 characterized by springs resiliently maintaining the segments spaced outwardly from said member.

GROVER R. GREENSLADE.

REFERENCES CITED

The following references are of record in the file of this patent:

UNITED STATES PATENTS

| Number | Name | Date |
|---|---|---|
| 664,144 | Gerhardt | Dec. 18, 1900 |
| 1,104,753 | Baluss | July 21, 1914 |
| 1,253,282 | Ruckardt | Jan. 15, 1918 |
| 1,407,693 | Heany | Feb. 28, 1922 |
| 1,440,470 | Kinnard | Jan. 2, 1923 |
| 1,525,286 | Gammeter | Feb. 3, 1925 |
| 1,567,728 | Greenslade | Dec. 29, 1925 |
| 1,895,643 | Putnam | Jan. 31, 1933 |
| 2,091,634 | Greenslade | Aug. 31, 1937 |
| 2,094,234 | Drain | Sep. 28, 1937 |
| 2,220,158 | Kohler | Nov. 5, 1940 |

FOREIGN PATENTS

| Number | Country | Date |
|---|---|---|
| 285,536 | Germany | July 5, 1915 |

OTHER REFERENCES

Electrical World, Aug. 8, 1925, pp. 257–259.